United States Patent
Giovanardi et al.

(10) Patent No.: US 12,112,748 B2
(45) Date of Patent: Oct. 8, 2024

(54) EXTRACTING FILLER WORDS AND PHRASES FROM A COMMUNICATION SESSION

(71) Applicant: Zoom Video Communications, Inc., San Jose, CA (US)

(72) Inventors: Davide Giovanardi, Saratoga, CA (US); Vijay Parthasarathy, San Jose, CA (US); Min Xiao-Devins, San Jose, CA (US); Xiaojing Zhao, Zhejiang (CN)

(73) Assignee: Zoom Video Communications, Inc., San Jose, CA (US)

( * ) Notice: Subject to any disclaimer, the term of this patent is extended or adjusted under 35 U.S.C. 154(b) by 244 days.

(21) Appl. No.: 17/589,826

(22) Filed: Jan. 31, 2022

(65) Prior Publication Data

US 2023/0230588 A1 Jul. 20, 2023

(30) Foreign Application Priority Data

Jan. 20, 2022 (CN) .......................... 202220158811.4

(51) Int. Cl.
*G10L 15/22* (2006.01)
*G06F 40/117* (2020.01)
(Continued)

(52) U.S. Cl.
CPC ............ *G10L 15/22* (2013.01); *G06F 40/117* (2020.01); *G06F 40/253* (2020.01); *G06F 40/30* (2020.01);
(Continued)

(58) Field of Classification Search
CPC ....... G10L 15/22; G10L 15/02; G10L 15/063; G10L 15/1815; G06F 40/253; G06F 40/117; G06F 40/30
See application file for complete search history.

(56) References Cited

U.S. PATENT DOCUMENTS

| 10,573,312 B1 * | 2/2020 | Thomson ................. G10L 15/22 |
| 2015/0195406 A1 * | 7/2015 | Dwyer ..................... G10L 15/02 |
| | | 379/265.07 |

(Continued)

FOREIGN PATENT DOCUMENTS

| CA | 3148554 A1 * | 2/2021 | ........... G06F 40/279 |
| CN | 103714813 A * | 4/2014 | ............. G10L 15/22 |

(Continued)

*Primary Examiner* — Mohammad K Islam
(74) *Attorney, Agent, or Firm* — Young Basile Hanlon & MacFarlane, P.C.

(57) ABSTRACT

Methods and systems provide for extracting filler words and phrases from a communication session. In one embodiment, the system receives a transcript of a conversation involving one or more participants produced during a communication session; extracts, from the transcript, utterances including one or more sentences spoken by the participants; identifies a subset of the utterances spoken by a subset of the participants associated with a prespecified organization; extracts filler phrases within the subset of utterances, the filler phrases each comprising one or more words representing disfluencies within a sentence, where extracting the filler phrases includes applying filler detection rules; and presents, for display at one or more client devices, data corresponding to the extracted filler phrases.

20 Claims, 8 Drawing Sheets

(51) Int. Cl.
*G06F 40/253* (2020.01)
*G06F 40/30* (2020.01)
*G10L 15/02* (2006.01)
*G10L 15/06* (2013.01)
*G10L 15/18* (2013.01)

(52) U.S. Cl.
CPC ............ *G10L 15/02* (2013.01); *G10L 15/063* (2013.01); *G10L 15/1815* (2013.01)

(56) References Cited

U.S. PATENT DOCUMENTS

| | | | |
|---|---|---|---|
| 2018/0061256 A1* | 3/2018 | Elchik | G09B 5/02 |
| 2019/0245972 A1* | 8/2019 | Dwyer | G06F 21/6254 |
| 2021/0342361 A1* | 11/2021 | Radzewsky | G06F 16/23 |
| 2023/0179709 A1* | 6/2023 | Dwyer | H04M 3/42221 |
| | | | 379/265.03 |
| 2023/0315987 A1* | 10/2023 | Shires | H04N 7/15 |
| | | | 704/9 |

FOREIGN PATENT DOCUMENTS

| | | | | |
|---|---|---|---|---|
| CN | 111062221 A | * | 4/2020 | ............ G10L 15/22 |
| CN | 114402384 A | * | 4/2022 | ............ G10L 15/22 |
| WO | WO-2020214316 A1 | * | 10/2020 | ............ G10L 15/22 |

\* cited by examiner

FIG. 4

| | filler word | filler word in context |
|---|---|---|
| 0 | i mean | What what a team? But then <I mean>, they made up for it. |
| 1 | i mean | <I mean>, I I can't really make fun of |
| 2 | like | s fan a little bit, but yeah, <like> I love the ae's red Sox robbe |
| 3 | like | red Sox robbery and Fenway is <like>, I would probably rather got t |
| 4 | i mean | site. It looks like you guys. <I mean> you have a huge, huge, huge |
| 5 | like | u you said that you guys have <like>, obviously 10 12,000 members |
| 6 | like | tings, education type events? <Like> what what does the used case |
| 7 | like | the licenses, primarily? For <like> small group meetings, educati |
| 8 | i mean | ion for an organization. Now, <I mean>, you've got to these members. |
| 9 | like | hat too is then if you've got <like>, if you're the person who's w |
| 10 | like | hese members. How many actual <like>, full time employees do you g |
| 11 | so yeah | <So yeah>, Pretty I mean, super simple |
| 12 | i mean | So yeah. Pretty <I mean>, super simple to manage. Supe |
| 13 | like | ay. Gotcha. You guys send out <like> like stipends for those? Or i |
| 14 | like | otcha. You guys send out like <like> stipends for those? Or is eve |
| 15 | oh | <Oh>, actually we create the accou |
| 16 | oh | <Oh>, just let me know when you're |

EXTRACTING FILLER WORDS AND PHRASES FROM A COMMUNICATION SESSION

FIELD OF INVENTION

The present invention relates generally to digital communication, and more particularly, to systems and methods for extracting filler words and phrases from a communication session.

SUMMARY

The appended claims may serve as a summary of this application.

BRIEF DESCRIPTION OF THE DRAWINGS

The present invention relates generally to digital communication, and more particularly, to systems and methods providing for extracting filler words and phrases from a communication session.

The present disclosure will become better understood from the detailed description and the drawings, wherein:

FIG. 4 is a diagram illustrating one example embodiment of a user interface presenting highlighted sections of filler phrases within a transcript of a conversation.

FIG. 5 is a diagram illustrating examples of filler words found within a transcript for a conversation, along with each filler word used in context.

FIG. 6 is a diagram illustrating one example embodiment of a user interface for presenting filler words used per minute of speakers for a conversation.

DETAILED DESCRIPTION

Figure 1A:
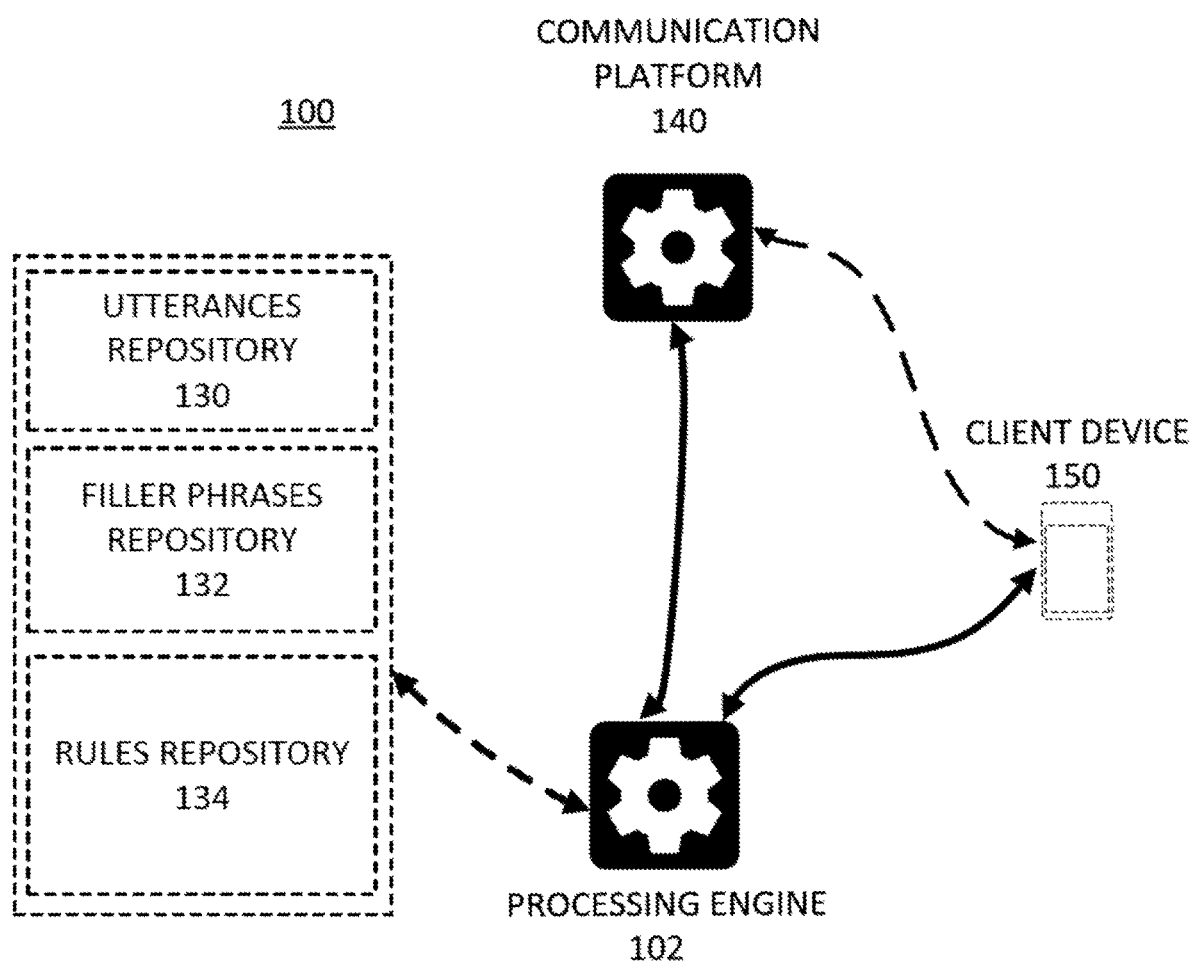
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the interne. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around whether and to what extent team members are using "filler phrases", composed of one or more "filler words", in a meeting with a prospective customer. Filler words and phrases refer to speech disfluencies introduced by a speaker during conversation, i.e., breaks or interruptions which occur in the flow of speech. Examples of common filler words or phrases for English speakers include, e.g., "uh", "like", "so", "so anyway", "um", and "you know". It would be highly valuable for sales representatives within a sales team, for example, to minimize the amount of filler words or phrases they use during a conversation with a prospective customer, in order to improve performance in sales meetings and come across in a more professional, polished, confident, and assertive fashion.

Thus, there is a need in the field of digital communication tools and platforms to create a new and useful system and method for extracting filler phrases within a communication session and presenting data relating to these filler phrases. The source of the problem, as discovered by the inventors, is a lack of useful meeting intelligence and analytics data provided to members of an organization with respect to remote communication sessions.

In one embodiment, the system receives a transcript of a conversation involving one or more participants produced during a communication session within a communication platform; extracts, from the transcript, utterances including one or more sentences spoken by the participants; identifies a subset of the utterances spoken by a subset of the participants associated with a prespecified organization; extracts filler phrases within the subset of utterances, the filler phrases each comprising one or more words representing disfluencies within a sentence, where extracting the filler phrases includes applying filler detection rules; and presents, for display to one or more users of the communication platform, data corresponding to the extracted filler phrases.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an utterances repository 130, filler phrases repository 132, and/or a rules repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
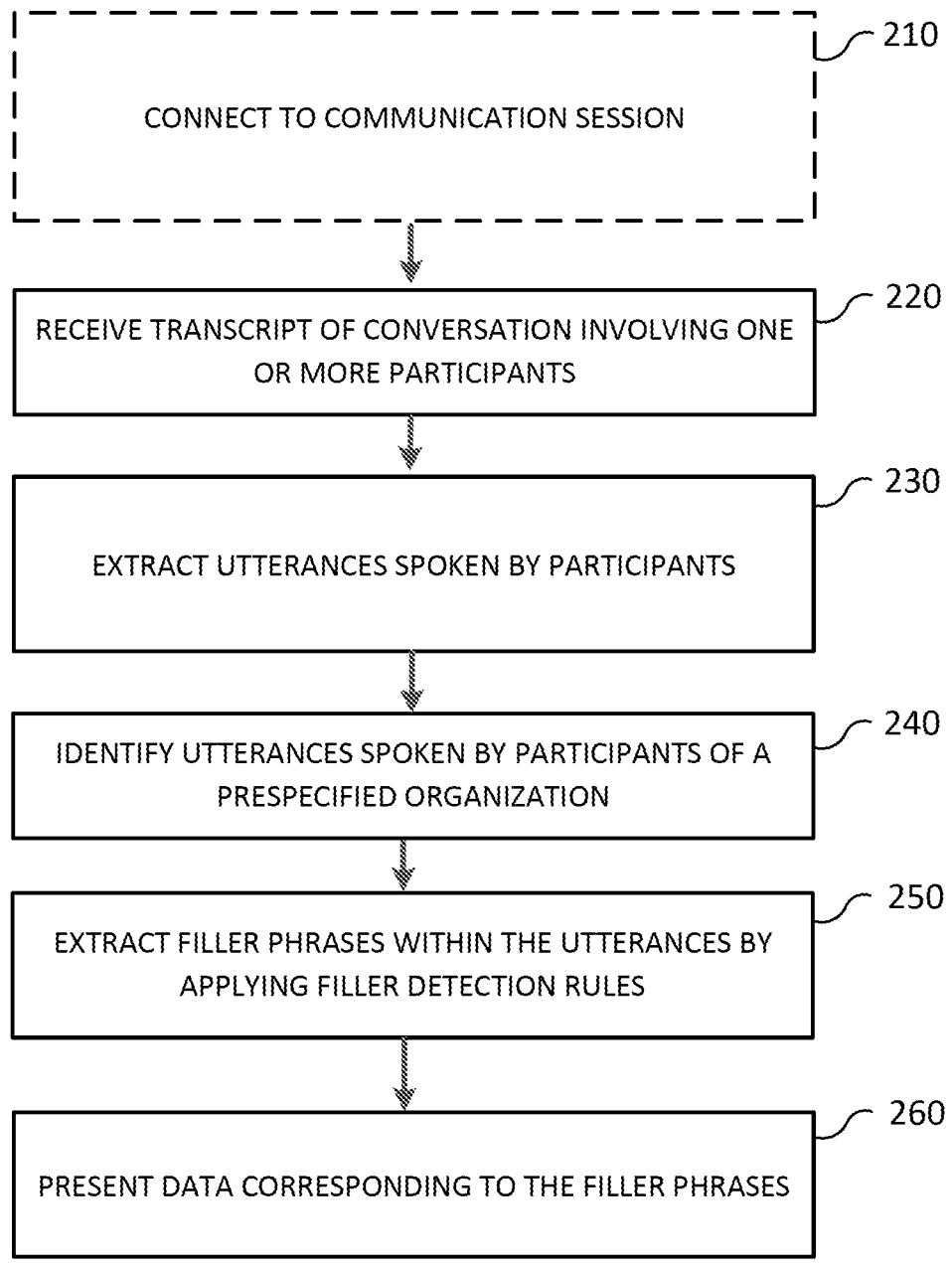
FIG. 2 is a flow chart illustrating an exemplary method that may be performed in some embodiments.

In an embodiment, the processing engine 102 may perform the exemplary method of FIG. 2 or other method herein and, as a result, extract filler words and phrases from a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an utterances repository 130, filler phrases repository 132, and/or rules repository 134. The optional repositories function to store and/or maintain, respectively, information on utterances within the session; filler phrases which are extracted; and rules which can be used for, e.g., filler word detection and detection of false positive filler phrases. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
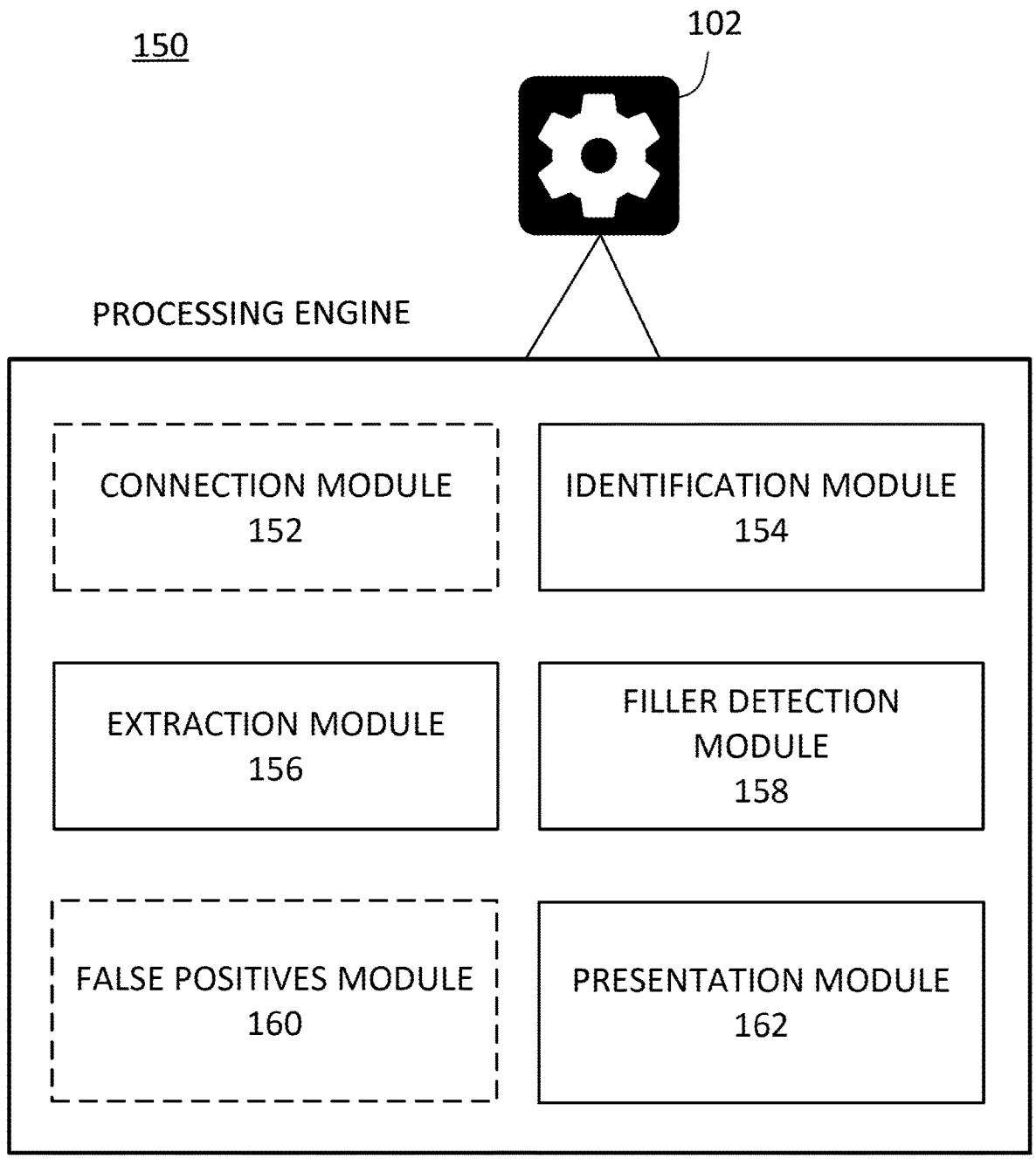
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

In some embodiments, optional connection module 152 functions to connect to a communication session with a number of participants, and receive or generate a transcript of a conversation between the participants produced during the communication session.

Identification module 154 functions to extract, from the transcript, a plurality of utterances each including one or more sentences spoken by the participants, and identify a subset of the utterances spoken by a subset of the participants associated with a prespecified organization.

Extraction module 156 functions to extract filler phrases within the subset of utterances.

Filler detection module 158 functions to apply filter detection rules to the subset of utterances to detect filler phrases and classify them into filler types from a predetermined list of filler types.

In some embodiments, optional false positives module 160 functions to apply additional rules to detect and remove false positives from the detected filler phrases.

Presentation module 162 functions to present, for display on one or more client devices, data corresponding to the extracted filler phrases.

The above modules and their functions will be described in further detail in relation to an exemplary method below.

FIG. 2 is a flow chart illustrating an exemplary method that may be performed in some embodiments.

In some embodiments, at optional step 210, the system connects to a communication session within a communication platform (e.g., a remote video session, audio session, chat session, or any other suitable communication session) having one or more participants. In some embodiments, the communication session can be hosted or maintained on a communication platform, which the system maintains a connection to. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation involving one or more participants produced during a communication session within a communication platform. That is, a conversation which was produced during a communication session is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session. That is, in varying embodiments, the transcript may be a live transcript (i.e., generated in real time as the conversation is occurring), a post-meeting transcript (i.e., generating and transmitted to one or more participants or other users after the meeting has concluded), or some combination thereof.

In some embodiments, the communication session includes multiple participants. Such participants may engage in the conversation between one another, or the conversation may only involve one presenting speaker, while the other participants remain silent. In either case, the system receives audio of the conversation which is recorded. This audio recording can then be processed by the system or an external system (such as an offline server) to generate a transcript based on the audio recording.

In some embodiments, only one participant is present within a communication session, and the transcript is received or generated based on the single participant's monologue within the communication session. One use case where such a session may be relevant is that of automated speech coaching; for example, a single participant may join a session where their speech is analyzed by an AI model configured to be activated for that session. The AI model may be trained to detect one or more speech quirks or possible inaccuracies in the speech, and present them to a user. In such a use case, a single participant would speak, and audio recording would be made of that speech, and a transcript is received or generated based on the session's conversation, likely via recorded audio of the session.

At step 230, the system extracts utterances spoken by the participants. Utterances are recognized by the system as one or more sentences attached to a specific speaker of that sentence (i.e., participant). Timestamps, as well as a speaker who uttered the utterance, may be attached to each utterance and/or each sentence. In some embodiments, the transcript itself provides clear demarcation of utterances based on the timestamps which are placed at the start of each utterance. Thus, extracting these utterances may involve extracting the separate utterances which have been demarcated by the timestamps in the transcript.

At step 240, the system identifies a subset of the utterances spoken by a subset of the participants associated with a prespecified organization. In some embodiments, the prespecified organization may be a business entity or company, department, team, organization, or any other suitable organization. In some embodiments, team members may identify themselves and/or one another as members, employees, contractors, or otherwise associated with the organization. In some embodiments, hierarchical relationships between users associated with the organization can be formed due to users explicitly providing such information, via the system implicitly drawing connections based on additional information, or some combination thereof. In some embodiments, a reporting chain of command can be established based on such implicit or explicit hierarchical relationships. In some embodiments, the system identifies that the participant is part of the organization upon the participant logging into the communication platform. In some embodiments, if the domain of the email address associated with the participant is the same email domain as a known member of an organization, they may be presumed to be associated with the organization as well. In some embodiments, within the context of a sales meeting involving sales representatives and prospective customers, the system can use organizational data to determine which participants are sales representatives and which participants are customers.

At step 250, the system extracts one or more filler phrases within the subset of the utterances. The filler phrases each constitute one or more words representing disfluencies within a sentence, such as, e.g., "like", "um", "uh", "so", "you know", "actually", and any other suitable words or phrases which serve as filler in a sentence or otherwise provide a break or interruption in the flow of speech. "Filler phrases" in the context of this application may be used interchangeably with or as a replacement for "filler words", i.e., individual words which serve as filler in a sentence.

In some embodiments, extracting the filler phrases can include applying one or more filler detection rules to the subset of utterances to detect the filler phrases and classify the filler phrases into filler types from a predetermined list of filler types. In some embodiments, these rules may be a set of deterministic rules for detecting filler phrases within the utterances found in a transcript, i.e., rules applied to various words or sentences within utterances for recognizing disfluencies in the conversation. In some models, such deterministic rules may be enough to detect a majority of filter words. In some embodiments, one of the filler types which filler phrases may be classified into by such rules is that of a discourse marker ("DM"), which signals the speaker's intent to mark a boundary in discourse. Examples of DMs may include, e.g., "you know" and "I mean". DMs often constitute the majority of filler words detected in a transcript. Another filler type is a filled pause ("FP"), which are words which represent a speaker's filling of a gap in discourse. Examples of FPs include, e.g., "uh", "uhm", "eh", and "ah". In some embodiments, explicit editing terms ("EET"s) may be classified as well, which consist of an overt statement from the speaker recognizing the existence of a disfluency.

In some embodiments, the deterministic rules for classifying filler phrases into filler types can depend on what the word in question is. Some examples of such rules can include, for instance: 1) labeling "like" as a non-DM if it is preceded by "seem", "m", "feel", "I", "n't", "something", "stuff", "things" "was", "would", "you", "s" or "re", or followed by "that" or "two"; 2) not labeling "so" as a DM if it is followed by particular part-of-speech type "IN" or preceded by "AUX" or "RB", or if the two preceding tokens were both "CC"; 3) not labeling "like" as a DM if it is followed by part-of-speech types "VBP" or "VB" or preceded by types "VBZ", "NN", or "NNS". In some embodiments, one or more of such deterministic rules may be added, modified, or removed in order to further adjust and tweak the accuracy or error date for the detection and classification of filler words.

In some embodiments, one or more of the deterministic rules are sensitive to the string's particular parsing hierarchy or tree. For example, "so" may not be labeled a DM if it is part of an adjectival or adverbial phrase, and "actually" may be only labeled a DM if it is part of a "UH" phrase or it is uppercase.

Many other such rules for detection and classification of filler words may be contemplated.

In some embodiments, extracting the filler phrases can include applying one or more additional rules to detect and remove false positives from the detected filler phrases. Such rules may be applied to particularly difficult-to-detect filler words. The rules are based, at least in part, on part-of-speech ("POS") tagging rules to exclude false positives. Such additional rules may include, e.g., improving the detection of "like" and reducing false positives for the word (which are common) by one or more of, e.g.: accounting for verbs of the senses, specifically feel, look, seem, smell, sound, and taste, and not classifying "like" as a filler word when it's preceded by one of these verbs, adding support for detecting an optional frequency adverb like "often", "sometimes", or "always" (for example, "I always like to wake up early" will not trigger detection of a filler word), such as, e.g., "I would like" or "I'd like".

In some embodiments, such additional rules may also include modification of such words as "so", "now" or "well" from a fixed filler word dictionary. Such words may now be classified as filler phrases if they appear in pairs, typically at the beginning of an utterance (for example, "so yeah" and "so now"). In some embodiments, additional rules may include reducing false positive for "you know" by filtering out phrases like "I'll let you know" or "would you know". In some embodiments, additional rules may include classifying "actually" as filler only if at the beginning of the utterance. Many other such additional rules may be contemplated.

At step 260, the system presents, for display to one or more users of the communication platform, data corresponding to the extracted filler phrases.

In some embodiments, the data is displayed to the users via one or more client devices associated with the users, which are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the one or more users of the communication platform may be one or more of: participant(s) of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on extracted filler phrases if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Figure 3:
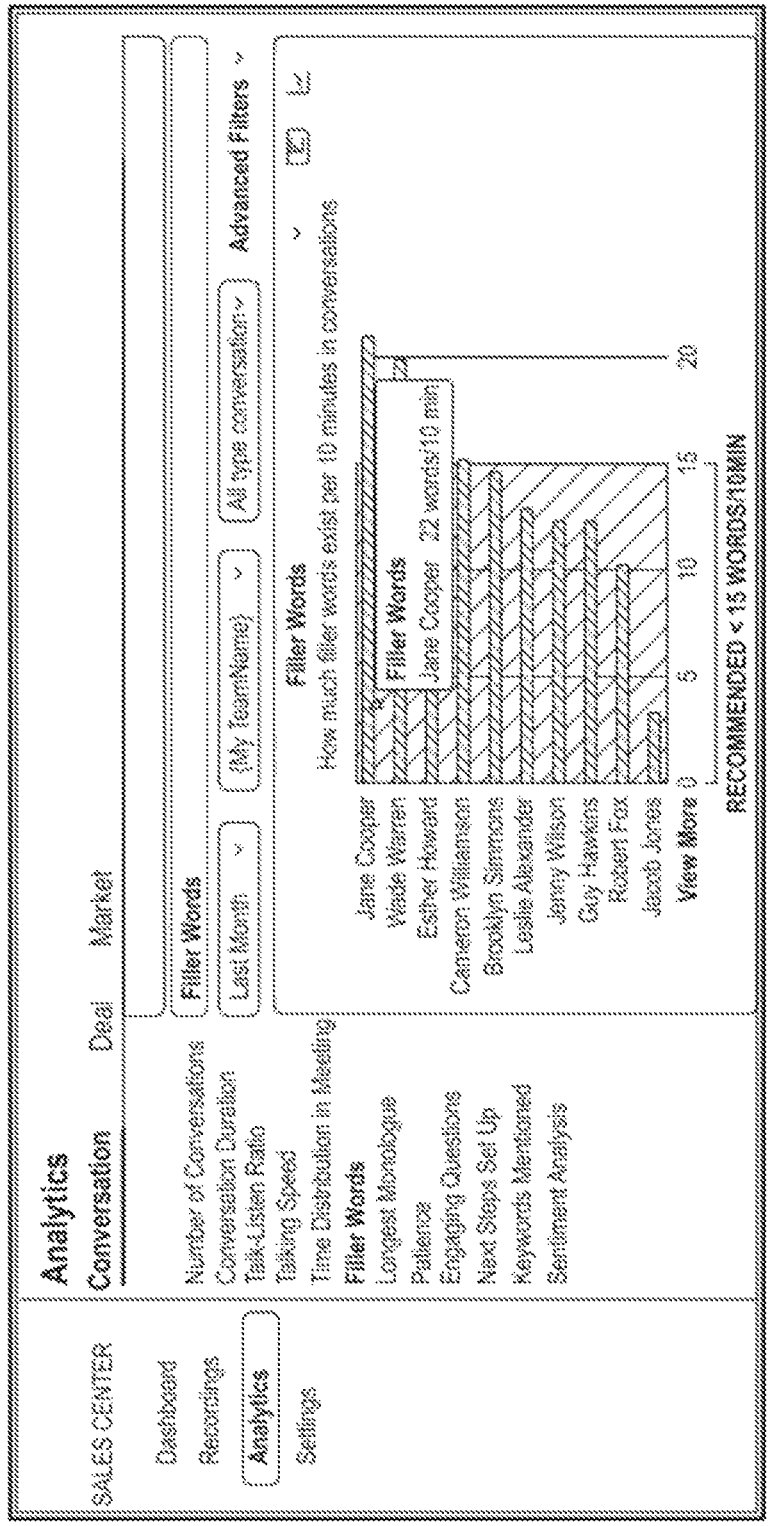
FIG. 3 is a diagram illustrating one example embodiment of a user interface for presenting data related to extracted filler phrases.

Within this displayed UI presented to the one or more client devices, data corresponding to the extracted filler phrases can be displayed. For example, a UI may be shown which displays aggregate analytics data pertaining to a sales team's meetings with clients over multiple conversations and communication sessions. Within this aggregate analytics data, average filler words used per minute across conversations can be displayed with respect to the entire team's performance. In some embodiments, data on average filler words used per minute during conversations is additionally or alternatively displayed for each individual member of a group. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

Figure 4:
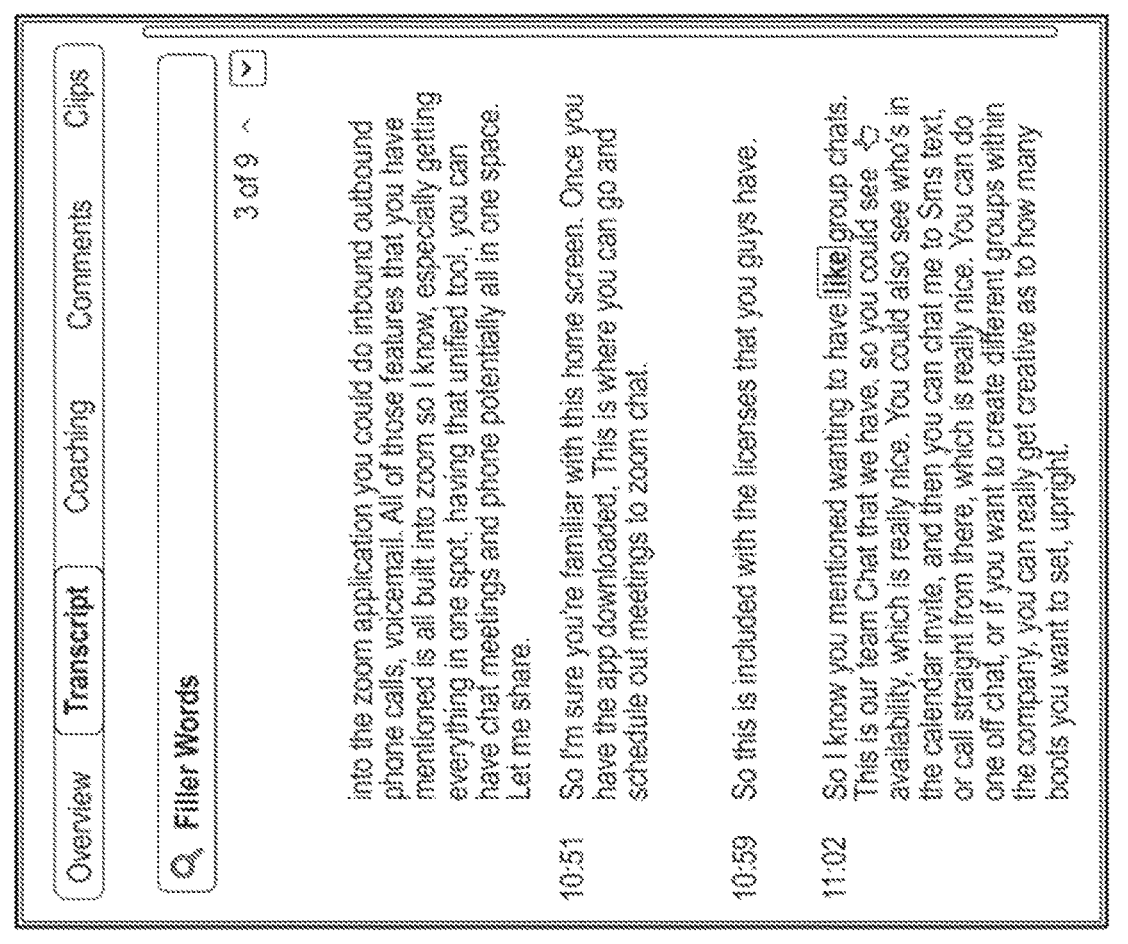
Figure 6:
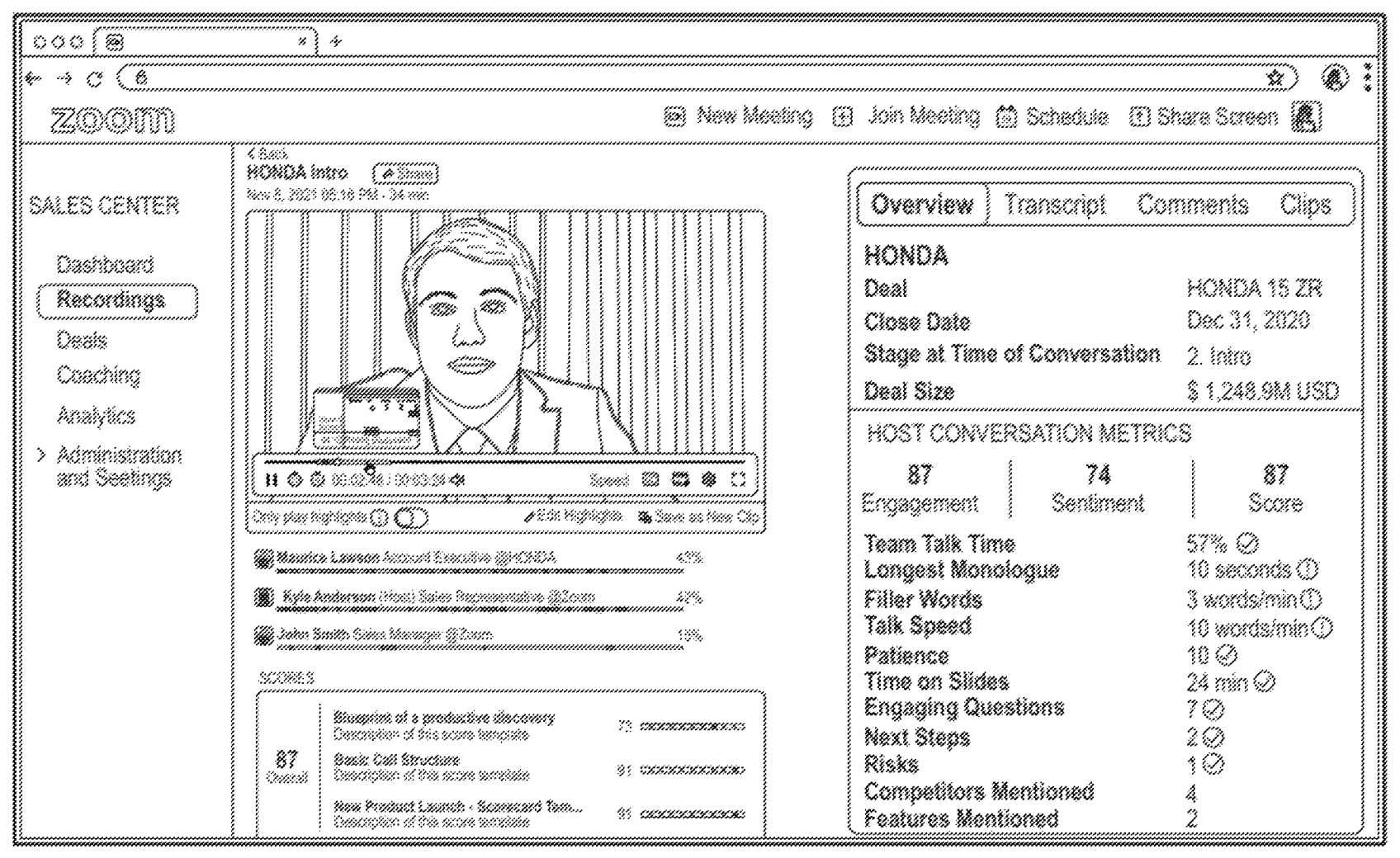

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the detected filler words used within the transcript in a highlighted or similar fashion. An example of such a UI is illustrated in FIG. 4, described in further detail below. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 6, described in further detail below.

FIG. 3 is a diagram illustrating one example embodiment of a user interface ("UP") for presenting analytics data related to extracted filler phrases.

Within the illustrated UI, an analytics tab is presented at a display of a client device. A "Conversation" sub-tab is displayed with a number of analytics and metrics related to an aggregate of multiple conversations which participants have participated in within communication sessions for a sales team. One of the analytics elements which can be further navigated to is labeled "Filler Words", which is currently selected for display within the UI window. This set of analytics data shown includes at least data, per participant associated with the organization, on how many filler phrases exist per 10 minutes in the conversation or in multiple conversations.

In the example, Jane Cooper has uttered over 20 filler phrases, Wade Warren has uttered 20 filler phrases, and on the low end, Jacob Jones has uttered less than 5 filler phrases. A "recommended" number below this data shows that a recommended ideal number of filler phrases per 10 minutes within conversations would be under 15 filler phrases. Thus, within this particular sales team, six participants have met the ideal or target suggested by the analytics tab for the amount of filler phrases per 10 minutes, while the remaining four participants have not.

Additionally, filters appear above the data which allow for filtering conversations based on time and team. In this example, conversations from last month are included in the time filter, while the participant's team name is used for the team for which analytics data is displayed. Additional advanced filters may be applied via a drop down box UI element, if desired.

FIG. 4 is a diagram illustrating one example embodiment of a user interface presenting highlighted sections of filler phrases within a transcript of a conversation.

In the illustrated screenshot, a UI window is shown which presents a transcript of a conversation which is or has been held for a communication session. In some embodiments, the transcript is retrieved from an existing database or repository of transcripts. In some embodiments, the system generates the transcript based on an audio recording of the conversation between participants, using one or more transcription techniques such as, e.g., automatic speech recognition.

In a search field near the top of the window, a user has entered "Filler Words" into the text field. The search engine element recognizes that the user wishes to see extracted filler words for the conversation which were extracted via the method described with respect to FIG. 2, and responds by highlighting, within the transcript, all extracted filler words that have been detected by the system. In some embodiments, the system retrieves all filler words from a repository and matches them to their place in the transcript as a whole, then presents them as highlighted within the transcript. In the illustrated example, at timestamp 11:02, the transcript reads, "So I know you mentioned wanting to have like group chats." In this sentence, "like" is highlighted as a filler word, since it functions as a placeholder or pause in the sentence. The user can scroll through the entirety of the transcript at will, and view other highlighted filler words. The user can also enter other search terms into the search field, and other words may become highlighted rather than the filler words.

FIG. 5 is a chart illustrating examples of filler words found within a transcript for a conversation, along with each filler word used in context.

The illustration shows a chart with 17 examples (0-16) of filler words that were detected within an example of a transcript produced for a communication session. Each of the examples shows the filler word itself, as well as a portion of the sentence with the filler word used in a larger context of that portion. The first two filler words, in rows 0 and 1, both read "I mean". The first is a use of the filler word mid-sentence ("But then <I mean>, they made up for it.") while the second is a use of the filler word at the beginning of a sentence ("<I mean>, I I can't really make fun of"). Although not detected or treated as a filler word, the two "I"s in the preceding example may indicate that the second of the "I"s is redundant and, in some embodiments, may be included within the list.

Other examples of filler words shown include several instances of "like", additional instances of "I mean", one instance of "so yeah", and two instances of "oh".

FIG. 6 is a diagram illustrating one example embodiment of a user interface for presenting filler words used per minute of speakers for a conversation.

Within the illustrated UI, a "Recordings" tab is presented at a display of a client device. Information about a specific recording of a communication session is displayed, including a video of the recording itself which can be played back in various ways or adjusted to skip to different times or topics within the video. A timeline allows the user to skip to different topic, and when the user hovers over a topic, a timestamp as well as a topic segment name is displayed.

On the right side of the window, a number of aggregate analytics data and/or metrics for the entire sales team are displayed with respect to the one, specific recording and communication session, including a "Filler Words" metric for the entire team. The Filler Words metric shows the data for the entire team in terms of average filler words used per minute, which in this example is 3 words per minute. Next to this data, an icon with an exclamation mark is displayed, indicating that this average number of filler words used per minute is either outside of or in danger of falling outside of a recommended average number of filler words per minute. In some embodiments, the recommended number is predetermined and fixed, while in other embodiments, the recommended number may be based on one or more recommendation criteria, such as the past performance of the team, recommended performances for the industry, an aggregate recommended performance for the combination of participants involved based on individual participant recommended performances, or any other such suitable criteria for generating a recommended figure for the metric.

Directly below the video playback UI element, a list of participants is shown for a particular topic segment, with data relating to each. The information presented for each participant, as well as the order of participants, may change based on the topic segment currently being played or currently skipped to. In some embodiments, a user may be able to click on his own name from this list, or potentially other participants, to receive individualized and/or customized analytics data pertaining to him or her in particular. For example, the filler words used per minute for just that participant may be displayed, or both the individual data for that participant as well as the aggregate data so that the participant can compare their own performance with respect to the total sales team involved in the conversation.

In some embodiments, this UI for the recording may additionally or alternatively show such metrics, including the "Filler Words" individual or aggregate data, for a particular topic within the conversation, depending on where in the video recording the participant has skipped to or is currently playing back. For example, if the user skips to timestamp 04:12 in the recording, which is labeled with topic segment "Pricing Discussion", then the UI may additionally or alternatively show the number of filler words per minute used that is calculated for that topic segment alone. In this way, users, e.g., sales teams and their individual sales representatives, can view analytics data on their performance for each individual topic, not just as a whole for the recording or across multiple conversations. This can be useful, for example, if a sales representative learns via the data that they use filler words relatively rarely during a description or pitch of a product, but introduce more filler words during a pricing discussion, which may introduce a negative effect on customer sentiment during the part of the conversation when pricing is discussed. The participant may then be able to correct this to lower the number of filler words used in the pricing discussion, thus improving his or her sales performance and leading to better sales results.

Figure 7:
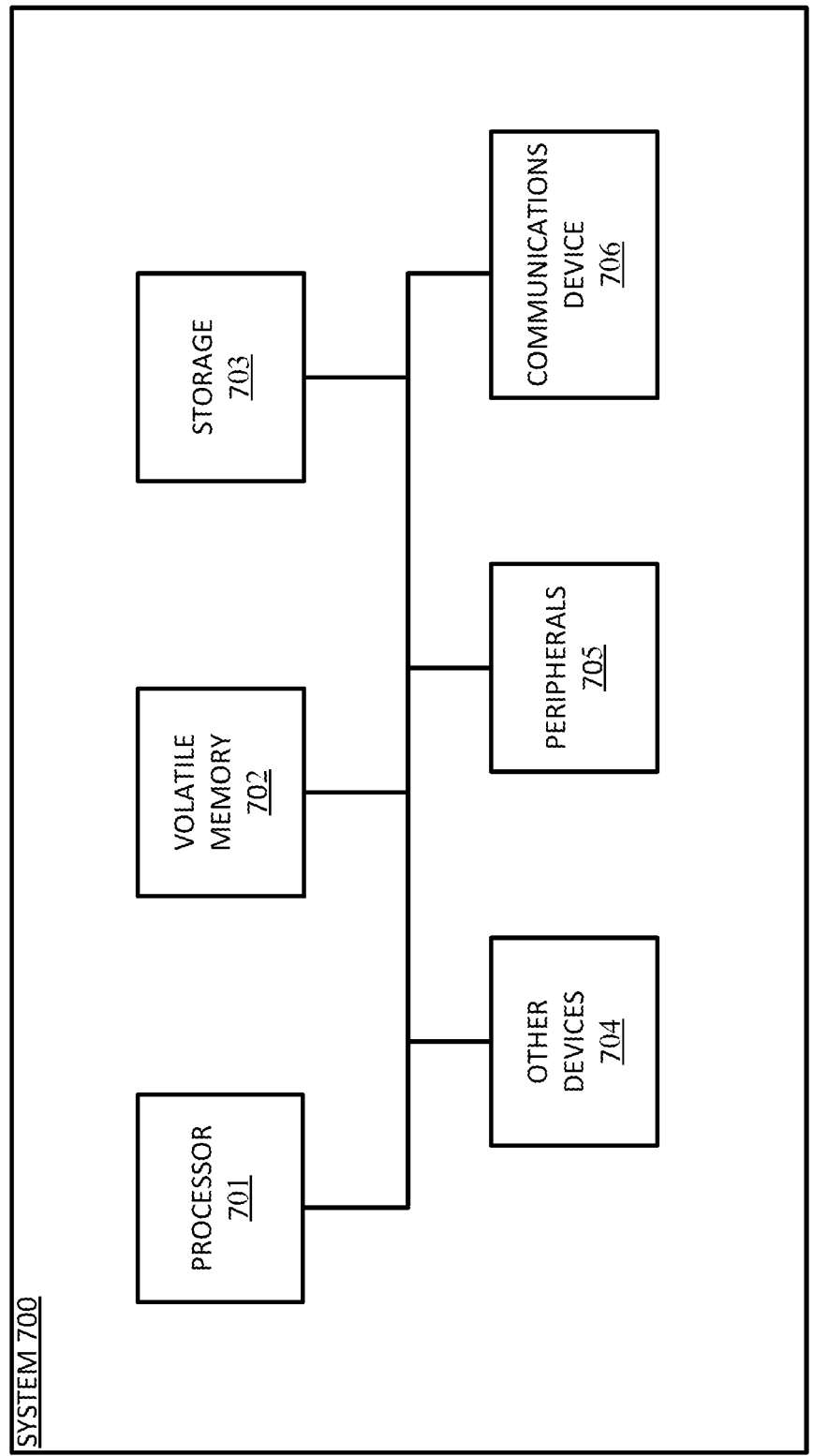
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1. A method, comprising: receiving a transcript of a conversation involving one or more participants produced during a communication session within a communication platform; extracting, from the transcript, a plurality of utterances comprising one or more sentences spoken by the participants; identifying a subset of the plurality of utterances spoken by a subset of the participants associated with a prespecified organization; extracting one or more filler phrases within the subset of utterances, the filler phrases each comprising one or more words representing disfluencies within a sentence, extracting the one or more filler phrases comprising: applying one or more filler detection rules to the subset of utterances to detect the filler phrases and classify the filler phrases into filler types from a predetermined list of filler types; and presenting, for display to one or more users of the communication platform, data corresponding to the extracted filler phrases.

Example 2. The method of example 1, wherein extracting the one or more filler phrases further comprises: applying one or more additional rules to detect and remove false positives from the detected filler phrases based at least in part on part-of-speech (POS) tagging.

Example 3. The method of any of examples 1-2, wherein presenting the data for display at the one or more client devices comprises: presenting the transcript of the conversation with highlighted sections comprising the one or more filler phrases.

Example 4. The method of any of examples 1-3, further comprising: determining a set of analytics data corresponding to the extracted filler phrases and the participants associated with speaking them, presenting the data for display at the one or more client devices comprising: presenting at least a subset of the analytics data corresponding to the extracted filler phrases.

Example 5. The method of example 4, wherein at least a portion of the set of analytics data comprises a calculation of the number of filler phrases identified within a predesignated window of time, the window of time being determined based on timestamps associated with the utterances.

Example 6. The method of any of examples 4-5, wherein at least a portion of the set of analytics data comprises one or more of: calculations of the number of filler phrases uttered by each of the participants associated with the organization, a calculation of an average number of filler phrases uttered by participants associated with the organization, and a comparison of the number of filler phrases in the conversation to a recommended number of filler phrases for a conversation of the same duration.

Example 7. The method of any of examples 4-6, wherein at least a portion of the set of analytics data comprises one or more comparisons of the number of extracted filler phrases within the communication session with the number of extracted filler phrases within one or more previous communication sessions associated with the organization or at least a subset of the participants associated with the organization.

Example 8. The method of any of examples 1-7, further comprising:
  connecting to the communication session with the one or more participants, wherein:
  the transcript is received or generated in real time while the communication session is underway, and the data is presented in real time to the one or more client devices while the communication session is underway.

Example 9. The method of any of examples 1-8, further comprising: training one or more artificial intelligence (AI) models to extract filler phrases in communication sessions, extracting the one or more filler phrases within the subset of the utterances being performed by the one or more AI models.

Example 10. The method of example 9, wherein at least a subset of the one or more AI models are trained to extract filler phrases in a plurality of languages.

Example 11. The method of any of examples 1-10, wherein the transcript of the conversation is generated via one or more automatic speech recognition (ASR) techniques.

Example 12. The method of any of examples 1-11, wherein: the communication session is a sales session with one or more prospective customers, the prespecified organization is a sales team, and the presented data relates to one or more performance metrics for the sales team.

Example 13. The method of any of examples 1-12, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 14. The method of any of examples 1-13, wherein the predetermined list of filler types comprises at least one or more of: discourse markers representing a speaker's intention to mark a boundary in discourse, and filled pauses representing a speaker's filling of a gap in discourse.

Example 15. The method of any of examples 1-14, wherein the one or more processors are further configured to perform the operations of: identifying a plurality of linguistic features within each sentence of the utterance, the linguistic features comprising at least parts of speech within the sentence; and labeling each of the words in the filler phrases as a part of speech within their respective sentences, at least one of the filler detection rules being based on the labeled parts of speech for words in the filler phrases.

Example 16. The method of any of examples 1-15, wherein at least one of the filler detection rules comprises matching one or more words with a filler phrase in a filler phrase dictionary.

Example 17. The communication system of example 16, wherein the filler phrase dictionary can be customized for one or more of: adding custom filler phrases, modifying filler phrases, and removing filler phrases.

Example 18. The method of any of examples 1-17, wherein at least one of the filler detection rules is based on identified locations of one or more words within a sentence or utterance.

Example 19. A communication system comprising one or more processors configured to perform the operations of: receiving a transcript of a conversation involving one or more participants produced during a communication session within a communication platform; extracting, from the transcript, a plurality of utterances comprising one or more sentences spoken by the participants; identifying a subset of the plurality of utterances spoken by a subset of the participants associated with a prespecified organization; extracting one or more filler phrases within the subset of utterances, the filler phrases each comprising one or more words representing disfluencies within a sentence, extracting the one or more filler phrases comprising: applying one or more filler detection rules to the subset of utterances to detect the filler phrases and classify the filler phrases into filler types from a predetermined list of filler types; and presenting, for display to one or more users of the communication platform, data corresponding to the extracted filler phrases.

Example 20. The communication system of example 19, wherein the one or more processors are further configured to perform the operations of: identifying a plurality of linguistic features within each sentence of the utterance, the linguistic features comprising at least parts of speech within the sentence; and labeling each of the words in the filler phrases as a part of speech within their respective sentences, at least one of the filler detection rules being based on the labeled parts of speech for words in the filler phrases.

Example 21. The communication system of any of examples 19-20, wherein at least one of the filler detection rules comprises matching one or more words with a filler phrase in a filler phrase dictionary.

Example 22. The communication system of example 21, wherein the filler phrase dictionary can be customized for one or more of: adding custom filler phrases, modifying filler phrases, and removing filler phrases.

Example 23. The communication system of any of examples 19-22, wherein at least one of the filler detection rules is based on identified locations of one or more words within a sentence or utterance.

Example 24. The communication system of any of examples 19-23, wherein extracting the one or more filler phrases further comprises: applying one or more additional rules to detect and remove false positives from the detected filler phrases based at least in part on part-of-speech (POS) tagging.

Example 25. The communication system of any of examples 19-24, wherein presenting the data for display at the one or more client devices comprises: presenting the transcript of the conversation with highlighted sections comprising the one or more filler phrases.

Example 26. The communication system of any of examples 19-25, further comprising:
determining a set of analytics data corresponding to the extracted filler phrases and the participants associated with speaking them, presenting the data for display at the one or more client devices comprising: presenting at least a subset of the analytics data corresponding to the extracted filler phrases.

Example 27. The communication system of any of examples 26, wherein at least a portion of the set of analytics data comprises a calculation of the number of filler phrases identified within a predesignated window of time, the window of time being determined based on timestamps associated with the utterances.

Example 28. The communication system of any of examples 26-27, wherein at least a portion of the set of analytics data comprises one or more of: calculations of the number of filler phrases uttered by each of the participants associated with the organization, a calculation of an average number of filler phrases uttered by participants associated with the organization, and a comparison of the number of filler phrases in the conversation to a recommended number of filler phrases for a conversation of the same duration.

Example 29. The communication system of any of examples 26-28, wherein at least a portion of the set of analytics data comprises one or more comparisons of the number of extracted filler phrases within the communication session with the number of extracted filler phrases within one or more previous communication sessions associated with the organization or at least a subset of the participants associated with the organization.

Example 30. The communication system of any of examples 19-30, further comprising: connecting to the communication session with the one or more participants, wherein: the transcript is received or generated in real time while the communication session is underway, and the data is presented in real time to the one or more client devices while the communication session is underway.

Example 31. The communication system of any of examples 19-30, further comprising:
training one or more artificial intelligence (AI) models to extract filler phrases in communication sessions, extracting the one or more filler phrases within the subset of the utterances being performed by the one or more AI models.

Example 32. The communication system of example 31, wherein at least a subset of the one or more AI models are trained to extract filler phrases in a plurality of languages.

Example 33. The communication system of any of examples 19-32, wherein the transcript of the conversation is generated via one or more automatic speech recognition (ASR) techniques.

Example 34. The communication system of any of examples 19-33, wherein: the communication session is a sales session with one or more prospective customers, the prespecified organization is a sales team, and the presented data relates to one or more performance metrics for the sales team.

Example 35. The communication system of any of examples 19-34, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 36. The communication system of any of examples 19-35, wherein the predetermined list of filler types comprises at least one or more of: discourse markers representing a speaker's intention to mark a boundary in discourse, and filled pauses representing a speaker's filling of a gap in discourse.

Example 37. The communication system of any of examples 19-36, wherein the one or more processors are further configured to perform the operations of: identifying a plurality of linguistic features within each sentence of the utterance, the linguistic features comprising at least parts of speech within the sentence; and labeling each of the words in the filler phrases as a part of speech within their respective sentences, at least one of the filler detection rules being based on the labeled parts of speech for words in the filler phrases.

Example 38. The communication system of any of examples 19-37, wherein at least one of the filler detection rules comprises matching one or more words with a filler phrase in a filler phrase dictionary.

Example 39. The communication system of any of example 38, wherein the filler phrase dictionary can be customized for one or more of: adding custom filler phrases, modifying filler phrases, and removing filler phrases.

Example 40. The communication system of any of examples 19-39, wherein at least one of the filler detection rules is based on identified locations of one or more words within a sentence or utterance.

Example 41. A non-transitory computer-readable medium containing instructions, comprising: instructions for receiving a transcript of a conversation involving one or more participants produced during a communication session within a communication platform; instructions for extracting, from the transcript, a plurality of utterances comprising one or more sentences spoken by the participants; instructions for identifying a subset of the plurality of utterances spoken by a subset of the participants associated with a prespecified organization; instructions for extracting one or more filler phrases within the subset of utterances, the filler phrases each comprising one or more words representing disfluencies within a sentence, extracting the one or more filler phrases comprising: applying one or more filler detection rules to the subset of utterances to detect the filler phrases and classify the filler phrases into filler types from a predetermined list of filler types; and instructions for presenting, for display to one or more users of the communication platform, data corresponding to the extracted filler phrases.

Example 42. The non-transitory computer-readable medium of example 41, wherein the one or more processors are further configured to perform the operations of: identifying a plurality of linguistic features within each sentence of the utterance, the linguistic features comprising at least parts of speech within the sentence; and labeling each of the words in the filler phrases as a part of speech within their respective sentences, at least one of the filler detection rules being based on the labeled parts of speech for words in the filler phrases.

Example 43. The non-transitory computer-readable medium of any of examples 41-42, wherein at least one of the filler detection rules comprises matching one or more words with a filler phrase in a filler phrase dictionary.

Example 44. The non-transitory computer-readable medium of any of examples 41-43, wherein the filler phrase dictionary can be customized for one or more of: adding custom filler phrases, modifying filler phrases, and removing filler phrases.

Example 45. The non-transitory computer-readable medium of any of examples 41-44, wherein at least one of the filler detection rules is based on identified locations of one or more words within a sentence or utterance.

Example 46. The non-transitory computer-readable medium of any of examples 41-45, wherein extracting the one or more filler phrases further comprises: applying one or more additional rules to detect and remove false positives from the detected filler phrases based at least in part on part-of-speech (POS) tagging.

Example 47. The non-transitory computer-readable medium of any of examples 41-46, wherein presenting the data for display at the one or more client devices comprises: presenting the transcript of the conversation with highlighted sections comprising the one or more filler phrases.

Example 48. The non-transitory computer-readable medium of any of examples 41-47, further comprising: determining a set of analytics data corresponding to the extracted filler phrases and the participants associated with speaking them, presenting the data for display at the one or more client devices comprising: presenting at least a subset of the analytics data corresponding to the extracted filler phrases.

Example 49. The non-transitory computer-readable medium of example 48, wherein at least a portion of the set of analytics data comprises a calculation of the number of filler phrases identified within a predesignated window of time, the window of time being determined based on timestamps associated with the utterances.

Example 50. The non-transitory computer-readable medium of any of examples 48-49, wherein at least a portion of the set of analytics data comprises one or more of: calculations of the number of filler phrases uttered by each of the participants associated with the organization, a calculation of an average number of filler phrases uttered by participants associated with the organization, and a comparison of the number of filler phrases in the conversation to a recommended number of filler phrases for a conversation of the same duration.

Example 51. The non-transitory computer-readable medium of any of examples 48-50, wherein at least a portion of the set of analytics data comprises one or more comparisons of the number of extracted filler phrases within the communication session with the number of extracted filler phrases within one or more previous communication sessions associated with the organization or at least a subset of the participants associated with the organization.

Example 52. The non-transitory computer-readable medium of any of examples 41-51, further comprising: connecting to the communication session with the one or more participants, wherein: the transcript is received or generated in real time while the communication session is underway, and the data is presented in real time to the one or more client devices while the communication session is underway.

Example 53. The non-transitory computer-readable medium of any of examples 41-52, further comprising: training one or more artificial intelligence (AI) models to extract filler phrases in communication sessions, extracting the one or more filler phrases within the subset of the utterances being performed by the one or more AI models.

Example 54. The non-transitory computer-readable medium of any of examples 41-53, wherein at least a subset of the one or more AI models are trained to extract filler phrases in a plurality of languages.

Example 55. The non-transitory computer-readable medium of any of examples 41-54, wherein the transcript of the conversation is generated via one or more automatic speech recognition (ASR) techniques.

Example 56. The non-transitory computer-readable medium of any of examples 41-55, wherein: the communication session is a sales session with one or more prospective customers, the prespecified organization is a sales team, and the presented data relates to one or more performance metrics for the sales team.

Example 57. The non-transitory computer-readable medium of any of examples 41-56, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 58. The non-transitory computer-readable medium of any of examples 41-57, wherein the predetermined list of filler types comprises at least one or more of: discourse markers representing a speaker's intention to mark a boundary in discourse, and filled pauses representing a speaker's filling of a gap in discourse.

Example 59. The non-transitory computer-readable medium of any of examples 41-58, wherein the one or more processors are further configured to perform the operations of: identifying a plurality of linguistic features within each sentence of the utterance, the linguistic features comprising at least parts of speech within the sentence; and labeling each of the words in the filler phrases as a part of speech within their respective sentences, at least one of the filler detection rules being based on the labeled parts of speech for words in the filler phrases.

Example 60. The non-transitory computer-readable medium of any of examples 41-59, wherein at least one of the filler detection rules comprises matching one or more words with a filler phrase in a filler phrase dictionary.

Example 61. The non-transitory computer-readable medium of example 60, wherein the filler phrase dictionary can be customized for one or more of: adding custom filler phrases, modifying filler phrases, and removing filler phrases.

Example 62. The non-transitory computer-readable medium of any of examples 41-61, wherein at least one of the filler detection rules is based on identified locations of one or more words within a sentence or utterance.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
receiving a transcript of a conversation involving one or more participants produced during a communication session within a communication platform;
extracting, from the transcript, a plurality of utterances comprising one or more sentences spoken by the participants, wherein each utterance of the plurality of utterances is associated with a topic of discussion for a portion of the communication session corresponding to the utterance;
identifying a subset of the plurality of utterances spoken by a subset of the participants associated with a prespecified organization;
extracting one or more filler phrases within the subset of utterances, the filler phrases each comprising one or more words representing disfluencies within a sentence, extracting the one or more filler phrases comprising:
applying one or more filler detection rules to the subset of utterances to detect the filler phrases and classify the filler phrases into filler types from a predetermined list of filler types;
correlating each filler phrase of the one or more filler phrases with the corresponding topic of discussion and a participant of the subset of the participants that spoke the filler phrase;
aggregating the filler phrases for multiple participants across multiple communication sessions; and
presenting, for display to one or more users of the communication platform, data corresponding to the aggregated filler phrases for each participant of the subset of the participants associated with the prespecified organization.

2. The method of claim 1, wherein extracting the one or more filler phrases further comprises:
applying one or more additional rules to detect and remove false positives from the detected filler phrases based at least in part on part-of-speech (POS) tagging.

3. The method of claim 1, further comprising:
presenting the transcript of the conversation with highlighted sections comprising the one or more filler phrases.

4. The method of claim 1, further comprising:
determining a set of analytics data corresponding to the extracted filler phrases and the participants associated with speaking them,
presenting the data for display at one or more client devices comprising:
presenting at least a subset of the analytics data corresponding to the extracted filler phrases.

5. The method of claim 4, wherein at least a portion of the set of analytics data comprises a calculation of a number of filler phrases identified within a predesignated window of time, the window of time being determined based on timestamps associated with the utterances.

6. The method of claim 4, wherein at least a portion of the set of analytics data comprises one or more of: calculations of a number of filler phrases uttered by each of the participants associated with the prespecified organization, a calculation of an average number of filler phrases uttered by participants associated with the prespecified organization, and a comparison of the number of filler phrases in the conversation to a recommended number of filler phrases for a conversation of the same duration.

7. The method of claim 4, wherein at least a portion of the set of analytics data comprises one or more comparisons of a number of extracted filler phrases within the communication session with a number of extracted filler phrases within one or more previous communication sessions associated with the prespecified organization or at least a subset of the participants associated with the prespecified organization.

8. The method of claim 1, further comprising:
connecting to the communication session with the one or more participants, wherein:
the transcript is received or generated in real time while the communication session is underway, and the data is presented in real time to one or more client devices while the communication session is underway.

9. The method of claim 1, further comprising:
training one or more artificial intelligence (AI) models to extract filler phrases in communication sessions,
extracting the one or more filler phrases within the subset of the utterances being performed by the one or more AI models.

10. The method of claim 9, wherein at least a subset of the one or more AI models are trained to extract filler phrases in a plurality of languages.

11. The method of claim 1, wherein:
the communication session is a sales session with one or more prospective customers,
the prespecified organization is a sales team, and
the presented data relates to one or more performance metrics for the sales team.

12. The method of claim 1, wherein the data is presented to one or more of: one or more participants of the communication session associated with the organization, one or more administrators or hosts of the communication session, one or more users within an organizational reporting chain of participants of the communication session, and/or one or more authorized users within the prespecified organization.

13. The method of claim 1, wherein the predetermined list of filler types comprises at least one or more of: discourse markers representing a speaker's intention to mark a boundary in discourse, and filled pauses representing a speaker's filling of a gap in discourse.

14. A communication system comprising one or more processors configured to perform the operations of:
receiving a transcript of a conversation involving one or more participants produced during a communication session within a communication platform;
extracting, from the transcript, a plurality of utterances comprising one or more sentences spoken by the participants, wherein each utterance of the plurality of utterances is associated with a topic of discussion for a portion of the communication session corresponding to the utterance;
identifying a subset of the plurality of utterances spoken by a subset of the participants associated with a prespecified organization;
extracting one or more filler phrases within the subset of utterances, the filler phrases each comprising one or more words representing disfluencies within a sentence, extracting the one or more filler phrases comprising:
applying one or more filler detection rules to the subset of utterances to detect the filler phrases and classify the filler phrases into filler types from a predetermined list of filler types;
correlating each filler phrase of the one or more filler phrases with the corresponding topic of discussion and a participant of the subset of the participants that spoke the filler phrase;

aggregating the filler phrases for multiple participants across multiple communication sessions; and presenting, for display to one or more users of the communication platform, data corresponding to the aggregated filler phrases for each participant of the subset of the participants associated with the prespecified organization.

15. The communication system of claim 14, wherein the one or more processors are further configured to perform the operations of:

identifying a plurality of linguistic features within each sentence of the utterance, the linguistic features comprising at least parts of speech within the sentence; and labeling each of the words in the filler phrases as a part of speech within their respective sentences, at least one of the filler detection rules being based on the labeling.

16. The communication system of claim 14, wherein at least one of the filler detection rules comprises matching one or more words with a filler phrase in a filler phrase dictionary.

17. The communication system of claim 16, wherein the filler phrase dictionary can be customized for one or more of: adding custom filler phrases, modifying filler phrases, and removing filler phrases.

18. The communication system of claim 14, wherein at least one of the filler detection rules is based on identified locations of one or more words within a sentence or utterance.

19. A non-transitory computer-readable medium containing instructions, comprising:

instructions for receiving a transcript of a conversation involving one or more participants produced during a communication session within a communication platform;

instructions for extracting, from the transcript, a plurality of utterances comprising one or more sentences spoken by the participants, wherein each utterance of the plurality of utterances is associated with a topic of discussion for a portion of the communication session corresponding to the utterance;

instructions for identifying a subset of the plurality of utterances spoken by a subset of the participants associated with a prespecified organization;

instructions for extracting one or more filler phrases within the subset of utterances, the filler phrases each comprising one or more words representing disfluencies within a sentence, extracting the one or more filler phrases comprising:

applying one or more filler detection rules to the subset of utterances to detect the filler phrases and classify the filler phrases into filler types from a predetermined list of filler types;

instructions for correlating each filler phrase of the one or more filler phrases with the corresponding topic of discussion and a participant of the subset of the participants that spoke the filler phrase;

instructions for aggregating the filler phrases for multiple participants across multiple communication sessions; and instructions for presenting, for display to one or more users of the communication platform, data corresponding to the aggregated filler phrases for each participant of the participants associated with the prespecified organization.

20. The method of claim 1, wherein the data presented corresponding to the aggregated filler phrases for each participant of the subset of participants changes based on the topic of discussion selected.

\* \* \* \* \*